INVENTORS
Jean Buissiere
Louis Colobert
Paul A. F. Montagnon

INVENTORS
Jean Buissiere
Louis Colobert
Paul A. F. Montagnon
BY
ATTORNEY

United States Patent Office

3,690,836
Patented Sept. 12, 1972

3,690,836
DEVICE FOR USE IN THE STUDY OF CHEMICAL AND BIOLOGICAL REACTIONS AND METHOD OF MAKING SAME
Jean Buissiere, Villeurbanne, Louis Colobert, Collonges-au-Mont-d'Or, and Paul A. F. Montagnon, La Balme-les-Grottes, France, assignors to Promoveo, Seyssinet, Isere, France
Continuation of abandoned application Ser. No. 618,942, Feb. 27, 1967. This application Nov. 12, 1970, Ser. No. 89,032
Claims priority, application France, Feb. 28, 1966, 47,000; Mar. 7, 1966, 47,031
Int. Cl. G01n *1/10, 21/06*
U.S. Cl. 23—253 TP        30 Claims

ABSTRACT OF THE DISCLOSURE

Devices for the study of chemical or biological reactions are provided by forming a sandwich of two plastic sheets having at least one sheet of porous water-absorbent material such as filter paper interposed therebetween. Upon compression of the sandwich, as between suitably designed heater electrodes, one or more chambers are formed, each chamber having a portion of the water-absorbent sheet positioned therein and having suitable apertures provided through which apertures chemicals, enzymes, and cell suspensions may be introduced for testing of the metabolic utilization of such chemicals by such enzymes or cells and observation of concomitant color reactions within said chambers.

CROSS-REFERENCE TO RELATED APPLICATIONS

This application is a continuation of copending application U.S. Ser. No. 618,942, filed on Feb. 27, 1967, now abandoned.

BACKGROUND OF THE INVENTION

The present invention relates to devices as set forth in the abstract, which are particularly useful in laboratories for the study of chemical or biological reactions, and is more particularly concerned with improved devices of the type described and with a method by which they may be inexpensively fabricated.

Devices of the general type concerned are known in the prior art and have generally been fabricated by molding separate sheets of plastic material, one to form a base member and the other to form a cover for the base member. Indentations or cavities are formed in the base member. Separate pieces of water-absorbent material, such as filter paper, are placed in each of the indentations or cavities together with appropriate chemicals and indicators, as desired, and secured therein as by means of transparent tape. The cell suspension to be tested is introduced to a protruding part of the filter paper, whereafter the complementary cover member is secured in position over the base member and the final assembly subjected to incubation. Such a method and apparatus has the disadvantage that fabrication of the final product requires several steps, some of them hand operations, rendering the process expensive and time consuming, and that inoculation of the test device with the cell suspension to be tested must be made before final assembly of the cover and base. Attempts to simplify the device and procedure involving elimination of the absorbent material between the base and cover sheet have not been successful.

SUMMARY OF THE INVENTION

It is an object of the invention to provide a method for the production of a study device of the type described, which method is greatly simplified and relatively inexpensive. It is a further object to provide such a method whereby a water-absorbent material is incorporated into the device during the molding operation without requiring a separate step. It is an additional object to provide an improved single-piece study device, wherein the absorbent sheet is an integral part of the unitary device, which may be prepared by the process of the invention. The accomplishment of the foregoing and additional objects will become more fully apparent hereinafter.

The process of the present invention consists principally in production of the described unitary devices by assembling and welding together with heat along a determined contour of limited width, two sheets of plastic material of which at least one is transparent, between which sheets there has been inserted an intermediate sheet made of a porous material which is advantageously impregnated with a thermoplastic resin and preferably comprising woven or non-woven fibers, at least a part of which fibers are of thermoplastic material. However, for certain applications, as for example where a woven fabric of large mesh is used, no thermoplastic resin or fibers need be added as the plastic sheets adhere to themselves through the fabric.

Experiments have shown that by employing heat welding, and especially high frequency welding, a perfect bond is obtained. It has further been found that the sheet of porous material affords a free capillary type space, and that, by employment of properly shaped electrodes and uniform conditions of heating, the desired volume can be imparted to this free capillary type space, since the upper impermeable plastic sheet can be applied either in direct contact with the porous sheet or spaced therefrom at intervals, thereby creating an empty space which remains of capillary type. Therefore, in all cases, perfect uniformity of capacity can be attained.

It has further been found that the porosity of the intermediate sheet may be used to advantage with a view to the preparation of study devices ready for use. For example, the sheet may be impregnated with a chemical substance, introduced through one or the other of two openings provided in the vicinity of the ends of the capillary tube, and thereafter dried in such manner as to be suitable for storage until the time of use. Alternatively, the sheets can be preloaded with these substances before assembly. When the thickness of the porous material of the intermediate sheet which occupies the capillary tube is liable to constitute a hindrance to the desired reaction or test, the said sheet may be provided in the form of at least two bands of porous material, which bands are disposed in such manner as to be located in the vicinity of the ends of the aforesaid capillary tube.

The process of the invention lends itself particularly well to the production of study devices of the multiple type, that is to say, structures which comprise a series of elementary devices provided side by side on a single support.

The invention in its preferred embodiment is illustrated by, and may be more readily understood from, the accompanying drawings in which.

No. 75445 Rampmeyer, C. M. 8–11–72 Day Mach. 58

DESCRIPTION OF THE PREFERRED EMBODIMENTS

References is made to the accompanying drawings, wherein all the parts are numbered and wherein the same numbers are used to refer to the same parts throughout.

Figure 1:
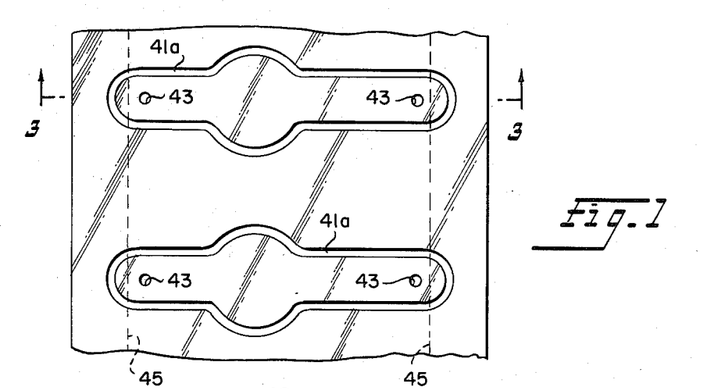
FIG. 1 is a fragmentary plan view showing a device of the multiple type prepared in accord with the invention.

To assemble the multiple study device illustrated in FIG. 1, two sheets 41 (FIG. 2) of a heat-weldable transparent plastic material, for instance of polyvinyl chloride, are placed in superposition. Between these two sheets 41 is interposed an absorbent support comprised of two bands or members 45 cut from a sheet of porous material preferably loaded, for example, impregnated, with an appropriate plastic material. Such a sheet may be constituted by artificial cellulose fibers (viscose), bound together by a thermoplastic resin, for example, polyvinyl alcohol or polyacrylamide. Ordinary filter paper may also be used in place of the artificial cellulose. It will be noted that the two bands or members 45 are disposed in such manner as to extend longitudinally along the corresponding edges of the two superposed sheets 41.

Figure 2:
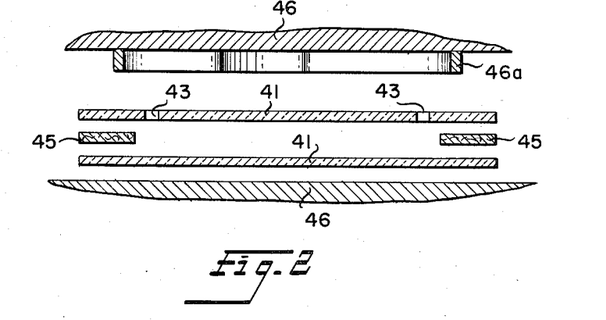
FIG. 2 is a diagrammatic transverse section showing in superposition the various elements which cooperate to form the structure of the device according to FIG. 1.

As shown, the assembly thus constituted is placed between the electrodes 46 of a high-frequency welding machine of conventional type, the upper electrode comprising a series of projections 46a preformed to the desired contour for the profile of each of the elementary devices or chambers of the multiple device, which projections 46a are of course provided in a number equal to that of the said elementary devices or chambers desired. In the embodiment under consideration, the profile of each of the elementary devices has two rectilinear portions which are axially aligned and connected with each other by a central rounded portion of a diameter larger than the width of the rectilinear portions.

Figure 3:
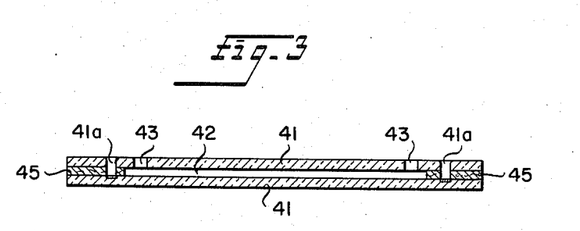
FIG. 3 is a transverse section taken at the line 3—3 of FIG. 1.

FIGS. 1 and 3 diagrammatically show the assembly after welding. The projections 46a of the upper electrode 46 have produced, in the upper sheet 41 and in the intermediate band 45 of porous material, imprints or impressions referenced 41a which tightly bind the two sheets 41 together. Within the profile of each imprint 41a is left a free space or capillary tube or chamber 42, connected with the ambient atmosphere by two perforations or apertures 43, which are provided in the upper sheet 41 before the welding operation. As shown, these two perforations 43 are so provided as to be located in the vicinity of the ends of the capillary tube 42, so as to permit the filling of the said tube and/or the introduction of solid substances thereinto. As previously indicated, the height of the projections 46a of the upper electrode 46 is designed so that the plane bottom of the electrode comes, at the end of the welding operation, into contact with the upper sheet 41, with a view to avoiding any untimely swelling of the latter. Under these conditions, the presence of the two bands 45 permits obtaining by standardized production devices, the capillary tube of which provides a uniform capacity.

Figure 4:
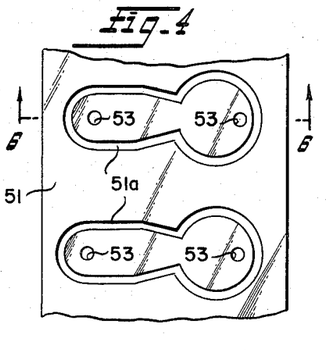
FIG. 4 is a fragmentary plan view showing a device of the multiple type prepared in accord with a modification of the invention shown in FIG. 1.
Figures 5, 8, 11, 13:
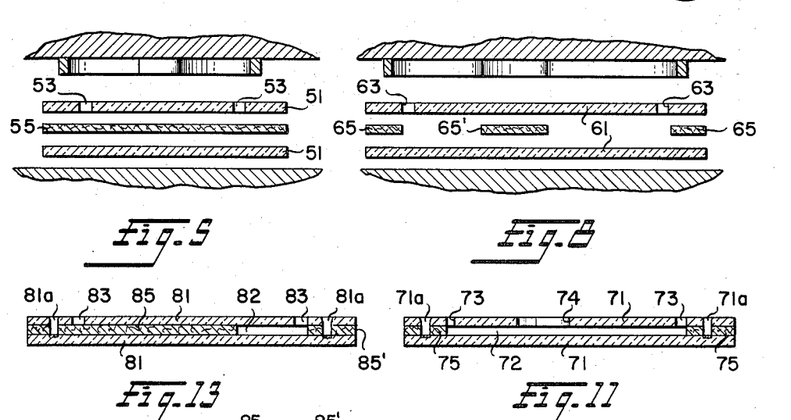
FIG. 5 is a diagrammatic transverse section showing in superposition the various elements which cooperate to form the structure of the device according to FIG. 4.
FIG. 8 is a diagrammatic transverse section showing in superposition the elements which cooperate to form the structure of the device according to FIG. 7.
FIG. 11 is a transverse section of the device taken at the line 11—11 of FIG. 10.
FIG. 13 is a transverse section of the device taken at the line 13—13 of FIG. 12.
Figure 6:
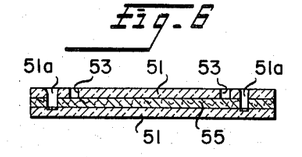
FIG. 6 is a transverse section of the device taken at the line 6—6 of FIG. 4.

In the modification of FIGS. 4 to 6, the multiple device is constituted by the assembly of two sheets 51 of plastic material, similar to the sheets 41 of the embodiment according to FIGS. 1 to 3. The intermediate sheet of porous material is however constituted by a single band or strip 55 which has substantially the same dimensions as each of the aforesaid sheets 51. The high-frequency welding operation includes as usual the application of sufficient pressure to deform the upper sheet and maintain it under molding pressure during the welding operation, thereby producing imprints 51a, each pierced by two perforations 53. The inner space of each of these imprints is occupied by the porous material of the band 55 in such manner that each one of the elementary devices or chambers may be easily impregnated by one or several liquid chemical substances and afterwards dried in an oven or the like. This impregnation may be readily effected through the above-mentioned perforations 53.

It will be noted that this modification according to the invention permits in particular the inexpensive construction of study devices of the kind described. At the time of use it is sufficient to introduce into each elementary device, previously impregnated with a selected chemical substance and with an appropriate indicating reagent, a small quantity of a bacterial suspension or the like to be studied.

Figure 7:
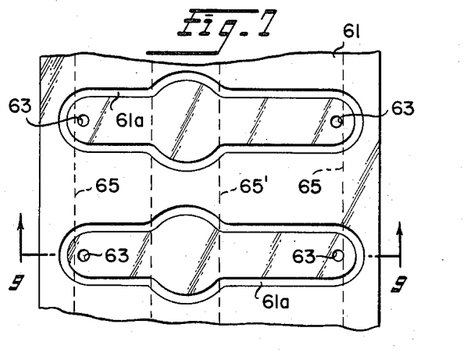
FIG. 7 is a fragmentary plan view of still another modification of the device of the invention.
Figure 9:
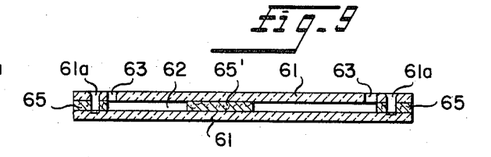
FIG. 9 is a transverse section of the device taken at the line 9—9 of FIG. 7.

FIGS. 7 to 9 illustrate another modification of the invention, according to which the multiple device is constituted by the high-frequency welding of two sheets 61 of plastic material between which are inserted three bands or strips which form the intermediate sheet of porous material. Two of these bands, referenced 65, are disposed in the immediate vicinity of the longitudinal edges of the sheets 61, while the central band 65' is situated in front of the rounded portion of each elementary chamber or device. Under these conditions each imprint 61a or elementary device affords two portions 62 of capillary tube, separated from each other by the rounded central portion, the inner space of which contains a disk of porous material. Here again the introduction of liquid substances into each device or chamber may be effected through the two perforations 63, produced in the upper sheet 61 before welding.

Figure 10:
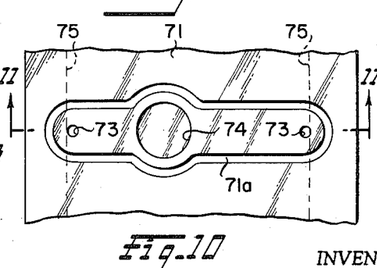
FIG. 10 is a fragmentary plan view of still another modification of the invention.

It is to be understood that one may combine the modes of construction corresponding to FIGS. 1 to 3 and 7 to 9. As illustrated in FIGS. 10 and 11, in such case the device according to the invention is constituted by the assembly of two sheets 71 of transparent plastic material, with the insertion of two bands 75 of loaded porous material, as in FIGS. 1 to 3. However the upper sheet 71 comprises, in addition to the two series of lateral perforations 73 for the introduction of the chemical or other substances, a row of central openings 74 which permit, at the time of the introduction, insertion of a disk or the like into the capillary tube or chamber 72 provided within each imprint 71a.

Figure 12:
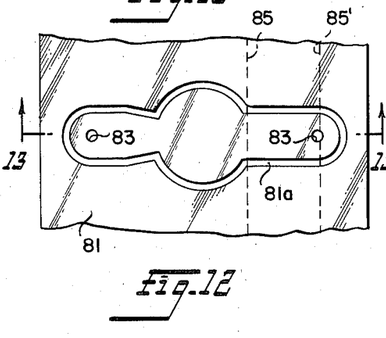
FIG. 12 is a fragmentary plan view of still another modification of the invention.

FIGS. 12 and 13 illustrate a modification of FIGS. 4 to 6, wherein the two sheets 81 of transparent plastic material are associated on the one hand with a band 85 of relatively large width, and on the other hand with a lateral band 85'. The two perforations 83 are effected in the vicinity of the ends of the inner space determined for each imprint 81a, which space thus comprises a portion occupied by the band 85 of porous material and a free capillary tube 82.

Figure 14:
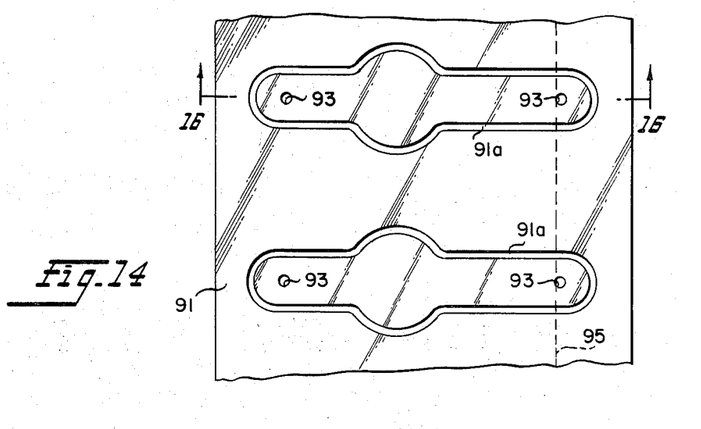
FIG. 14 is a fragmentary plan view showing a device of the multiple type prepared in accord with another embodiment of the invention.
Figure 15:
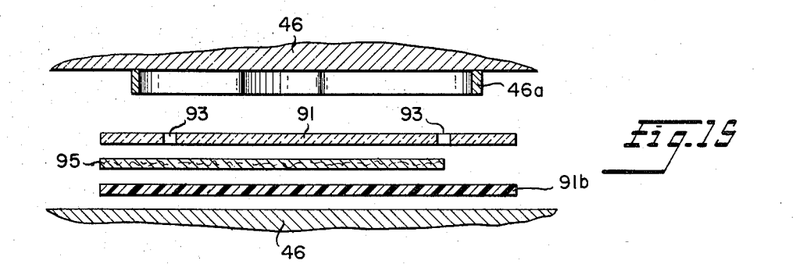
FIG. 15 is a diagrammatic transverse section showing in superposition the various elements which cooperate to form the structure of the device of FIG. 14.
Figure 16:
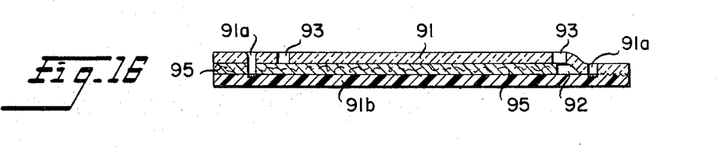
FIG. 16 is a transverse section of the device taken at the line 16—16 of FIG. 14.

In FIGS. 14–16, another embodiment of the invention is shown. The structure is formed from a transparent plastic sheet 91 and another plastic sheet 91b rendered opaque as for example by having a white pigment dispersed therein. The lower plastic sheet 91b is made opaque in order to facilitate the reading of the color changes of any indicator which might be utilized in the reaction to be tested. Only a single sheet 95 of porous material is used. At one edge the sheet 95 is substantially in registry with the edges of the sheets 91 and 91b. However, the sheet 95 is provided with a narrower width than that of the sheets 91 and 91b, the edge of the sheet 95 being disposed in the vicinity of one of the perforations 93. Subsequently, when the structure is completed by molding within the molds 46 to provide the imprints 91a, a small capillary chamber or tube 92 remains.

Figures 17, 18:
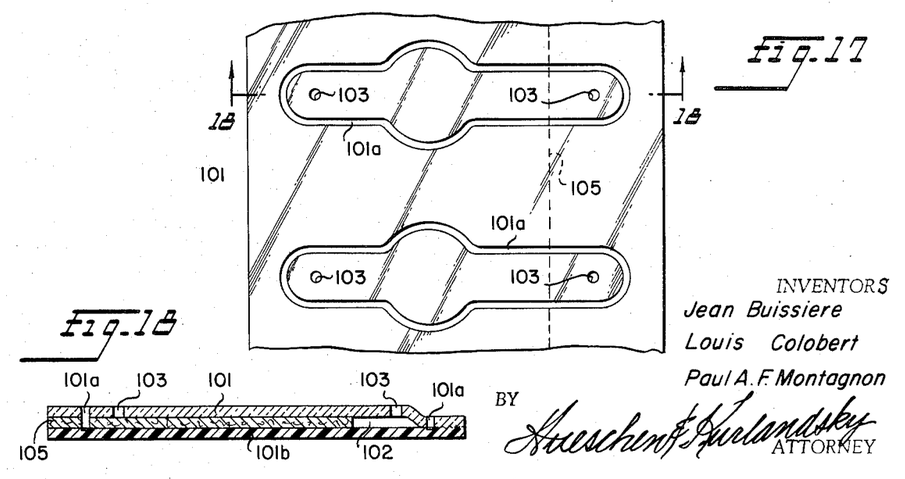
FIG. 17 is a fragmentary plan view of a device according to a modification of the embodiment of FIG. 14.
FIG. 18 is a transverse section of the device taken at the line 18—18 of FIG. 17.

In the embodiment illustrated in FIGS. 17 and 18, the porous sheet 105 has a smaller width than that of the porous sheet 95 of the embodiment of FIGS. 14–16. The porous sheet 105 is sandwiched between a transparent plastic sheet 101 provided with apertures or openings 103 and an opaque plastic sheet 101b similar to the plastic sheet 91b. After the sheets have been molded together, as described, to form the imprints 101a, a capillary chamber or tube 102 remains which is larger than the chamber 92 of FIGS. 14–16, thereby permitting a larger amount of liquid to be introduced thereinto.

Figure 19:
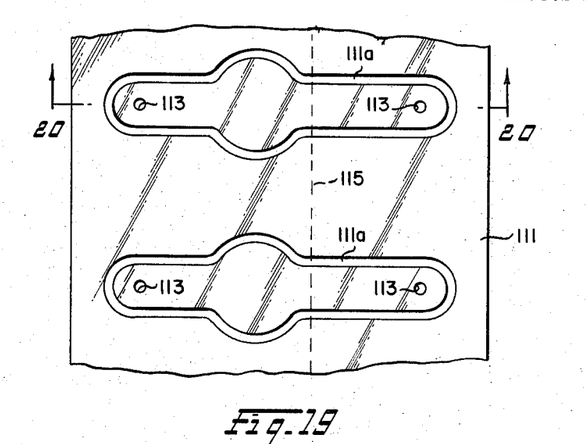
FIG. 19 is a fragmentary plan view of a device prepared in accord with a further modification of the embodiment of FIG. 14.
Figure 20:
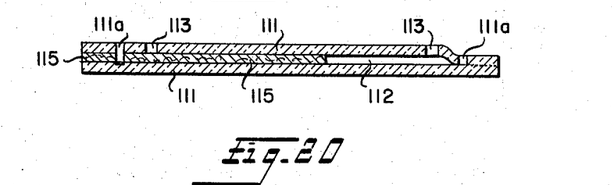
FIG. 20 is a transverse section of the device taken at the line 20—20 of FIG. 19.

In the embodiment shown in FIGS. 19 and 20, the porous sheet 115 is narrower than that of the sheet 105 of FIGS. 17 and 18 and is placed between two transparent plastic sheets 111 with one edge in registry with the edges of the plastic sheets and the other edge terminating just beyond the median line of the sheets. Apertures 113 are provided in the upper sheet 111. After molding, as described above, to form a plurality of prints 111a, a large capillary chamber or tube 112 remains. In this embodiment both plastic sheets are transparent in order to permit the reactions to be studied by means of a microscope utilizing transmitted light. It is of course understood that the porous sheet 115 may be varied in width so that it may be either greater or smaller than that shown and may vary to the extent of that of FIGS. 14–18.

Figure 21:
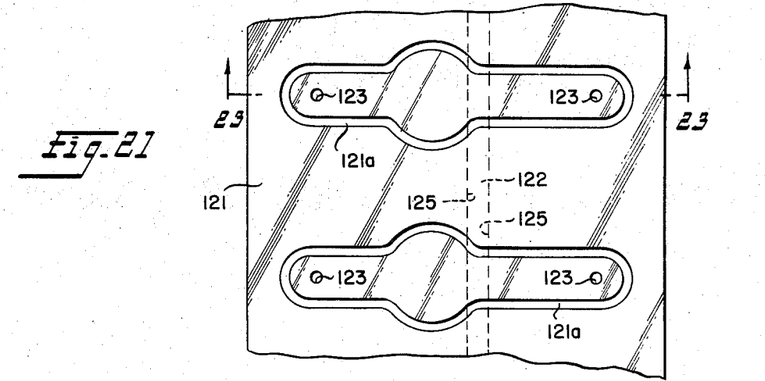
FIG. 21 is a fragmentary plan view of still another embodiment of the invention.
Figure 22:
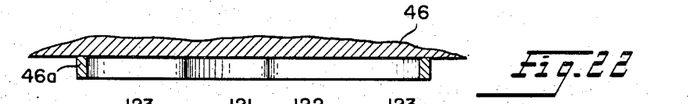
FIG. 22 is a diagrammatic transverse section showing in superposition the various elements which cooperate to form the structure of the device according to FIG. 21.
Figure 23:
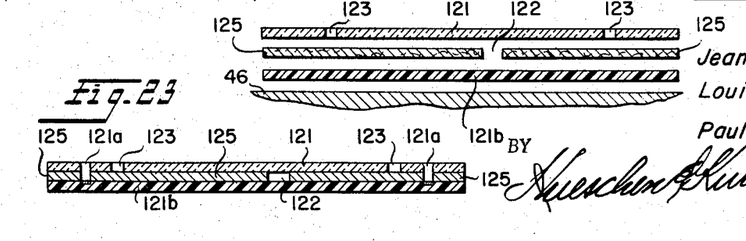
FIG. 23 is a transverse section of the device taken at the line 23—23 of FIG. 21.

Still another embodiment is shown in FIGS. 21–23. In this embodiment two porous sheets 125 are used, each in registry at one lateral end with the edges of a transparent plastic sheet 121 and an opaque plastic sheet 121b. The other edges of the porous sheets 125 extend to the center of the device and terminate in spaced-apart relationship. Apertures 123 are provided in the sheet 121. Subsequently, when the sheets are molded to provide imprints 121a, a capillary chamber or tube 122 remains which is defined by the inner edges of the porous sheets 125 and the surfaces of the plastic sheets 121 and 121b. Suitable devices have been found to result when the sheets 125 are spaced apart from about ⅛ to about ¼ inch.

In use, one of the porous sheets or bands 125 may be impregnated through one of the apertures 123. As a result, one of the sheets become saturated, but only up to the leading edge defining one side of the space between the two center sheets. The other sheet acts as a reservoir for moisture to keep the reactants in a moist condition during the period of incubation of the organisms to be tested. The opening 123 which is not used for filling permits a quick air exhaust when a solution or suspension, e.g., of cells, is added through the other opening, and speeds the flow of liquid onto the paper. Such flow would be impeded if only one opening were available. The second porous sheet which is not directly impregnated with liquid serves to catch any overflow of the cell suspension and additionally provides an atmosphere of high humidity during the incubation period of the organisms which are being tested.

Figure 24:
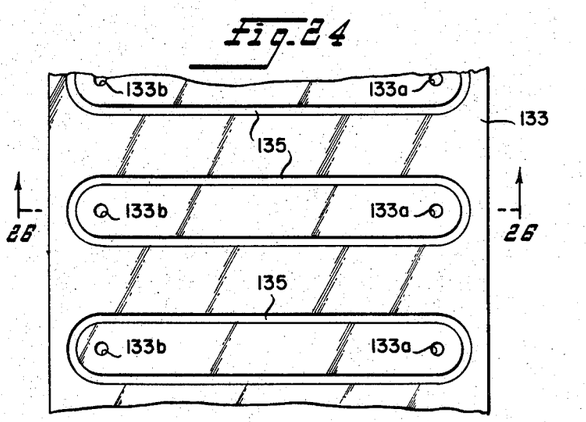
FIG. 24 is a fragmentary plan view of an additional embodiment of the invention.
Figure 25:
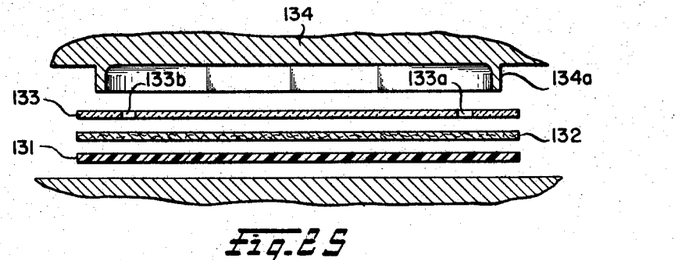
FIG. 25 is a diagrammatic transverse view showing in superposition the various elements which cooperate to form the structure of the device according to FIG. 24.
Figure 26:
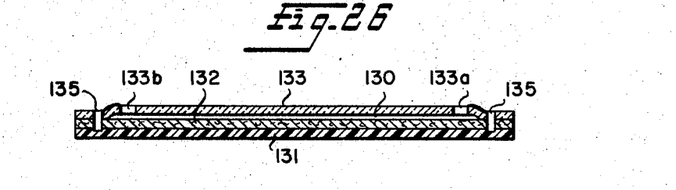
FIG. 26 is a transverse section taken at the line 26—26 of FIG. 24.

The embodiment of the invention shown in FIGS. 24–26 is also formed by joining, by welding along a given contour, two sheets of plastic material between which there is inserted at least one intermediate sheet of absorbent material adapted to form the absorbent support. The support of absorbent material is directly combined inside the cell formed by the restricted space provided between the two sheets of plastic material. The welding member, formed with the profile desired for the device, is dimensioned and shaped so as to produce on one of the sheets of plastic material a convex profile with a height slightly greater than the thickness of the absorbent support. Thus, the inner face of the convex sheet is not in contact with the face of the absorbent support which is opposite it, and this factor facilitates impregnation of the support and allows more rapid filling of the device or chamber when the cellular suspension that is to be examined is put in place through the opening 133a. Moreover, certain chemical substances in particular give rise to formation of a sort of impermeable coating on the absorbent support which sometimes prevents subsequent impregnation of the said support by the cellular suspension. It will be appreciated that the above-mentioned free space allows filling by capillary action, even when the absorbent support is covered with such an impermeable layer.

The device of the invention, including the device of FIGS. 24–27, lends itself particularly well to the mass production of investigative devices of the multiple type, that is to say comprising a number of elementary devices or chambers directly connected to one another. In fact, it is sufficient to arrange the welding tool so as to carry out the joining operation in a series of zones spaced regularly along the sheets employed.

In order to produce the investigative device shown in FIG. 24, there are placed in superposed arrangement (FIG. 25) a first sheet 131 consisting of a transparent plastic material (polyvinyl chloride, for example), an intermediate sheet 132 consisting of a transparent material and a top sheet 133 substantially identical to the sheet 131. The sheet 132 may and preferably does consist of artificial fibers of cellulose (viscose) which are suitably bonded to one another, for example by a synthetic resin (polyvinyl alcohol or the like). The top sheet 133 has two series of perforations 133a and 133b provided in the vicinity of the longitudinal edges of the said sheet, it being pointed out that these perforations 133a and 133b are aligned transversely in pairs and that they are spaced regularly along the aforesaid edges.

As shown, the assembly formed in this manner is placed between the welding members 134 of a welding machine, which will be assumed to be a high-frequency welding machine in the case in question. The upper member or electrode 134 comprises a series of reliefs 134a formed with the contour desired for the profile of each of the elementary devices or chambers of the multiple device to be produced, the number of these reliefs 134a provided being, of course, equal in number to the number of said elementary devices or chambers desired.

FIGS. 24 and 26 show diagrammatically the assembly obtained after welding. The reliefs 134a of the upper electrode 134 have formed, in the top sheet 133 and in the interposed sheet 132, impressions bearing the reference 135 which join the sheets 131 and 133 to one another in a liquid-tight manner and retain the said sheet 132. As indicated above, each relief 134a is dimensioned and shaped so that, taking account of the welding conditions, the top sheet 131 assumes a slightly convex profile after the joining has been effected, thus forming inside each impression 135 a free space of limited volume in communication with the outside air through the two perforations 133a and 133b. The height of this free space is very slightly greater than the thickness of the sheet 132, so that the upper face of the latter is not in contact with the opposite face of the convex sheet 131, as shown at 130 in FIG. 26.

Tests have shown that in this manner devices are obtained the interior space of which has an absolutely regular capacity. These devices have all the advantages of those described in the earlier-described embodiments, and mass production thereof is simple and economic. Their use is particularly easy. The metabolic substance is placed in position through one of the two top openings, for example through the opening 133a. In the same way, the impregnation of the support through the opposite opening 133b is carried out. These two impregnations are very accurately regulated so that the two substances introduced in this way into the support of absorbent material are perfectly separated from one another. At the time of use, the enzyme or cell suspension to be studied or identified is placed in position through the opening 133a. The air is thus gradually expelled through the opening 133b so that, when the elementary device or chamber in question has been filled, it is in a state of at least partial anaerobiosis. Under these conditions, after eventual reaction of the cell on the metabolic substance, the products of degradation produce in contact with the indicating reagent a perfectly visible diffusion fringe.

It will be noted that the use of the device according to this embodiment of the invention is particularly economical since it requires only a very small quantity of metabolic substance, indicating reagent and cell suspension.

Figure 27:
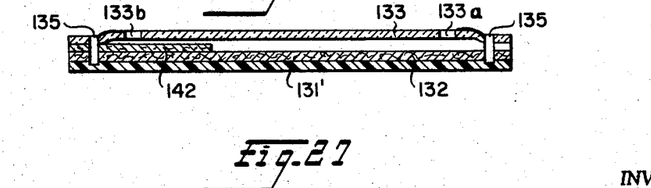
FIG. 27 is a transverse section of still another embodiment of the invention.

In the variation shown in FIG. 27, the support of absorbent material is formed by joining two interposed sheets together in superposed arrangement. The sheet 132 is identical to that according to FIGS. 24 to 26, while the superposed sheet, bearing the reference 142, has a width which is reduced so that it only extends over a part of the length of the restricted free space. In this variant, it is moreover assumed that the bottom sheet, bearing the reference 131, is made opaque and has a white coloring adapted to facilitate visual examination.

In this constructional form, the sheet 142 can be conveniently impregnated with the indicating reagent prior to its assembly with the sheets of plastic material. Once assembly has been carried out, the metabolic substance is introduced through the openings 133a and the device is then dried, as in the case of the constructional form according to FIGS. 24 to 26, in order to be stored as long as desired. At the time of use, the cell suspension is placed in position through the opening 133a so as to impregnate the support 132 and 142 for the purpose of the metabolism test as just described for the device of FIG. 26.

In preparing the testing devices of the present invention in any of the embodiments described above and shown in the drawings, various reagents, biological nutritive media and indicators may be applied to the porous material either before the molding operation, as by general impregnation, or after assembly by introducing the materials through one of the apertures provided at the ends of each unit device or chamber. In carrying out the various tests which are possible with the present devices, the chemical or biological culture to be tested may subsequently be introduced through one of the apertures. For example, for biological testing, cultures of living cells may be introduced through the apertures provided at the end of each chamber and spread over the nutritive media, as for example agar-agar gel. Additional moisture may also be added where necessary. Where metabolic functions of particular substances by living cells are to be studied, as for example for identification of micro-organisms, test materials and indicators may be introduced which are specific for the particular micro-organisms to be tested. According to one method of testing, the porous material may be impregnated with a mixture containing a specific chemical substance to be tested and an indicating reagent. A suspension of cells, usually in the resting state, is then deposited upon a portion of the porous material. The metabolic products resulting from the action by the cells, e.g., a micro-organism, upon the chemical cause a characteristic color change in the indicator which may be readily observed through the transparent wall of the chamber.

Chemical reactions may be studied with the present devices by successively introducing various chemicals, reagents and indicators to produce characteristic color changes.

The device according to the invention is characterized in that the absorbent support constituted by the elements or members composed of absorbent material is disposed inside a restricted space formed between two impermeable walls, at least one of which is transparent and has openings formed at the ends of the said space to permit impregnation of the said support by capillarity effect.

It will be understood that the elements composed of absorbent material are impregnated in one case with the metabolic substance and in the other case with the indicating reagent, it being possible to effect this impregnation easily through the openings in the device which is then subjected to a drying operation in order to be kept ready for use when desired. It is obvious that the above-mentioned impregnation must be carried out in a strictly regulated manner, in order to ensure exact localization of the metabolic substance and the reagent and permit a precise method of identification. It will also be understood that filling of the device with the enzymatic agent (e.g., cell suspension) to be studied is effected by capillarity in which case the liquid gradually expels the air enclosed in the above-mentioned restricted space, which air escapes through the opposite opening. This impregnation, of course, is effected through the opening used for the prior placing in position of the metabolic substance.

In the case where the reaction is intended to be examined by means of a microscope, both the impermeable walls may be made transparent. When, on the other hand, it is desired to observe a coloration, it is preferable that one of the walls be opaque and have a white coloring, so as to form a background for visual examination. This opacity can be obtained either by coating the outer face of the impermeable wall in question with a suitable varnish, or by directly incorporating pigments into the material of which the said wall is constituted. It will also be understood that the absorbent support may occupy the entire length of the aforesaid restricted space, or, on the other hand, may extend over only a part of this space. Of course, the support of absorbent material may consist of two parts assembled together in superposition or in juxtaposition, or of a single cut-out.

Separation of the support into two separate elements has the objective of handling the effect of the indicating reagent on the development of the metabolism carefully, because the reagents always have either a toxic action or a chemical composition such that they interfere with the equilibrium of the metabolism. When, in the present state of knowledge, the reagent to be used is too toxic to permit metabolism, it is possible to add it last of all at the time of use, instead of impregnating one of the two elements of the support with it. It will moreover be noted that the two elements which form the absorbent support may be constituted by two parts of one and the same blank suitably cut out of a sheet of absorbent material.

In all the constructional forms described in the foregoing, the absorbent material forms with the plastic sheets a space or chamber separated from the external environment and within which the reaction between the metabolic substance (i.e., substrate) in question and the type of cells to be studied takes place in the presence of the indicating reagent intended to make the said reaction clear. The three elements which take part in this reaction, namely the metabolic substance, the cell to be studied (in the form of a suspension of cells) and the indicating reagent, occupy well-defined zones of the device, so that the said reaction causes the rapid appearance of a diffusion fringe which is particularly visible on that portion or part of the said device which is intended for observing the meeting between the products of degradation deriving from this reaction and the indicating reagent.

It goes without saying that the dimensions of the elementary devices may vary within wide limits. However, for illustrative purposes, dimensions of a suitable structure are provided below, taking into consideration the rounded portions, of an elementary device according to FIGS. 12 and 13, i.e., of an imprint 81a which in the course of tests has given excellent results:

| | | |
|---|---|---|
| Length | mm | 40 |
| Width | mm | 5 |
| Total thickness | mm | 1 |
| Inner thickness | mm | 0.6 |
| Inner volume | $cm.^3$ | 0.125 |
| Actual capacity | cl | 0.1 |

The difference between the inner volume and the actual capacity results from the presence of the intermediate bands 85 and 85' of porous material.

It is understood that one could greatly multiply the examples of study devices capable of being provided according to the present invention. It is conceived in particular that the plan profile of the elementary devices, as well as the number of the perforations, may be varied practically without limit.

It is therefore to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

We claim:

1. A device suitable for use in the study of chemical and biological reactions which comprises two superposed plastic sheets, at least one of which is transparent, said sheets being permanently sealed together at a continuous perimeter and defining a capillary reaction chamber of predetermined contour and volume; and an uncompressed absorbent means within said capillary chamber, one of the said plastic sheets being provided with at least one aperture providing direct access to said reaction chamber and providing communication with the ambient atmosphere.

2. The device of claim 1 wherein two spaced apertures are provided for direct access to said chamber.

3. The device of claim 1 suitable for use in the study of chemical and biological reactions wherein the absorbent means is a porous absorbent sheet disposed intermediate said plastic sheets, said sheets being sealed together at a plurality of continuous perimeters and defining a plurality of capillary chambers each having a position of said porous absorbent sheet disposed in each chamber; one of said plastic sheets being provided with at least two spaced noncapillary apertures for each chamber providing direct access to each of said chambers and the porous absorbent sheet being integrally bonded to the plastic sheets at said continuous perimeters.

4. The device according to claim 3 wherein said porous sheet has a heat-fusible resin provided therein to facilitate sealing said sheets to each other.

5. The device according to claim 3 wherein one plastic sheet is opaque, thereby facilitating the observance of color changes within said chambers through the other of said sheets.

6. The device according to claim 3 wherein said porous sheet is narrower than said plastic sheets and extends into only a portion of each of said chambers, thereby providing a space within each chamber free of said porous sheet.

7. The device of claim 1 suitable for use in the study of chemical and biological reactions wherein said uncompressed absorbent sheet means comprises two porous absorbent sheets in superposition disposed intermediate said plastic sheets.

8. The device according to claim 7 wherein said absorbent sheets are of unequal length and one of said absorbent sheets contains a metabolizable chemical and the other contains an indicating reagent adapted to detect the presence of degradation products of said chemical.

9. The device according to claim 7 wherein said chamber has a height slightly greater than the combined thicknesses of said absorbent sheets, thereby forming a capillary chamber above said absorbent sheets.

10. A device in accordance with claim 1 wherein each of said chambers contains an indicating chemical substance.

11. A device suitable for use in the study of chemical and biological reactions which comprises two superposed plastic sheets, at least one of which is transparent, said sheets being permanently sealed together at a continuous perimeter to define a liquid-tight reaction chamber within said perimeter, said reaction chamber defining a space of predetermined contour and volume and being of a fixed capacity, an uncompressed porous absorbent sheet means secured within said reaction chamber at the perimeter thereof, one of said plastic sheets being provided with at least one aperture of predetermined shape and size providing direct access to said reaction chamber, said aperture confronting the other of said plastic sheets and providing communication with the ambient atmosphere, the internal height of said reaction chamber being slightly greater than the thickness of said absorbent sheet thereby forming a capillary chamber above said absorbent sheet.

12. A device suitable for use in the study of chemical and biological reactions which comprises two superposed plastic sheets, at least one of which is transparent, said sheets being permanently sealed together at a continuous perimeter to define a liquid-tight reaction chamber within said perimeter, said reaction chamber defining a space of predetermined contour and volume and being of a fixed capacity, one of the said plastic sheets being provided with at least one aperture of predetermined shape and size providing direct access to said reaction chamber, said aperture confronting the other of said plastic sheets and providing communication with the ambient atmosphere, the internal height of said chamber being substantially less than the length thereof.

13. A device in accordance with claim 12 suitable for use in the study of chemical and biological reactions, wherein a dry indicating reagent is present in said reaction chamber, whereby when a substance to be tested is introduced through said aperture, an indicating reaction will occur in said chamber.

14. A device in accordance with claim 12 suitable for use in the study of chemical and biological reactions, wherein an absorbent means is disposed in said reaction chamber.

15. A device in accordance with claim 14 suitable for use in the study of chemical and biological reactions, wherein said absorbent means is an absorbent sheet and a dry indicating reagent is present on said absorbent sheet.

16. A device in accordance with claim 12 suitable for use in the study of chemical and biological reactions, wherein said sheets are permanently sealed together at a plurality of continuous perimeters, each of which perimeters defines a said liquid-tight reaction chamber.

17. A device according to claim 16 suitable for use in the study of chemical and biological reactions, wherein a dry indicating reagent is present in each reaction chamber.

18. A device in accordance with claim 17 suitable for use in the study of chemical and biological reactions, wherein means are provided for rendering one of said plastic sheets substantially opaque.

19. A device in accordance with claim 12 suitable for use in the study of chemical and biological reactions, wherein two spaced apertures of predetermined shape and size provide direct access to said reaction chamber.

20. A device according to claim 12 suitable for use in the study of chemical and biological reactions, wherein porous absorbent sheet material having upper and lower surfaces is disposed between said plastic sheets, said upper surface confronting the inner surface of one of said plastic sheets and said lower surface confronting an inner surface of the other of said plastic sheets, all of said sheets being sealed together at a continuous perimeter to define said reaction chamber, and a capillary chamber lying between a pair of said surfaces.

21. A method for the production of a device suitable for use in the study of chemical and biological reactions which comprises assembling in superposition a pair of plastic sheets, at least one of which is transparent, permanently sealing said sheets together at a continuous perimeter to define a liquid-tight reaction chamber within said perimeter, said reaction chamber defining a space of predetermined contour and volume and being of a fixed capacity, one of said plastic sheets being provided with at least one aperture of predetermined shape and size providing direct access to said reaction chamber, and providing communication with the ambient atmosphere, the internal height of said chamber being substantially less than the length thereof, and introducing an indicating reagent through said aperture into said chamber.

22. The method in accordance with claim 21 for the production of a device suitable for use in the study of chemical and biological reactions wherein said permanent sealing step comprises welding said sheets together at said continuous perimeter.

23. The method in accordance with claim 21 for the production of a device suitable for use in the study of chemical and biological reactions comprising the further step of positioning a sheet of porous absorbent material between said plastic sheets prior to permanently sealing them, wherein said sealing step secures said absorbent sheet at said perimeter, and positions a portion of said absorbent sheet within said chamber.

24. The method in accordance with claim 21 for the production of a device suitable for use in the study of chemical and biological reactions wherein said indicating reagent is introduced in a liquid medium, and further the step of drying said reagent to evaporate said medium.

25. The method in accordance with claim 23 for the production of a device suitable for use in the study of chemical and biological reactions wherein said indicating reagent is introduced in a liquid medium, and further the step of drying said reagent to evaporate said medium.

26. The method in accordance with claim 21 for the production of a device suitable for use in the study of chemical and biological reactions wherein said plastic sheets are sealed together at a plurality of continuous perimeters, each perimeter defining a said reaction chamber within said perimeter, and introducing indicating reagent into each said chamber.

27. The method in accordance with claim 26 for the production of a device suitable for use in the study of chemical and biological reactions wherein each of a plurality of said chambers is provided with a selected indicating reagent in a liqud medium, and further the step of drying said reagents to evaporate said medium.

28. The method in accordance with claim 23 for the production of a device suitable for use in the study of chemical and biological reactions wherein said porous sheet has a heat-fusible resin provided therein to facilitate sealing said plastic sheets to each other.

29. The method in accordance with claim 23 for the production of a device suitable for use in the study of chemical and biological reactions wherein said porous sheet is narrower than said plastic sheets and extends into only a portion of each of said chambers, thereby providing a space within each capillary chamber free of said porous sheet.

30. The method in accordance with claim 23 for the production of a device suitable for use in the study of chemical and biological reactions wherein said porous sheet is divided into at least two separate strips.

References Cited
UNITED STATES PATENTS

| | | | |
|---|---|---|---|
| 2,904,474 | 9/1959 | Forg | 195—103.5 X |
| 3,234,107 | 2/1966 | Kaufman et al. | 195—103.5 X |
| 3,338,794 | 8/1967 | Bladel | 195—103.5 X |
| 3,348,331 | 10/1967 | Katz et al. | 23—292 |
| 3,367,841 | 2/1968 | Buissiere et al. | 23—253 TP, X |
| 3,378,347 | 4/1968 | Saravis | 23—253 |
| 3,378,481 | 4/1968 | Saravis et al. | 23—253 X |
| 3,390,962 | 7/1968 | Goldsmith | 23—253 |

MORRIS O. WOLK, Primary Examiner

R. E. SERWIN, Assistant Examiner

U.S. Cl. X.R.

23—230 R, B, 259, 292; 195—103.5 R, 127, 139

UNITED STATES PATENT OFFICE
CERTIFICATE OF CORRECTION

Patent No. 3,690,836      Dated 12 September 1972

Inventor(s) J. Buissiere et al.

It is certified that error appears in the above-identified patent and that said Letters Patent are hereby corrected as shown below:

Col. 3, line 47
delete "No. 75445 Rampmeyer, C.M. 8-11-72 Day Mach. 58"

Claim 3, line 6
See Amendment under Rule 111, dated 24 February 1972, page 2, amendment to Claim 16

"position"      -- portion --

Claim 27, line 5
See Amendment under Rule 111, dated 24 February 1972, Claim 51

"liqud"      -- liquid --

References cited - Col. 12, line 48
See Paper No. 2

"3,348,331 10/1967 Katz et al."
-- 3,348,921 10/1967 Katz et al. --

Signed and sealed this 30th day of January 1973.

(SEAL)
Attest:

EDWARD M. FLETCHER, JR.
Attesting Officer

ROBERT GOTTSCHALK
Commissioner of Patents